United States Patent
Maruyama et al.

(10) Patent No.: US 8,704,482 B2
(45) Date of Patent: Apr. 22, 2014

(54) POWER CONVERSION DEVICE

(75) Inventors: Takafumi Maruyama, Tokyo (JP); Takeo Matsumoto, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 434 days.

(21) Appl. No.: 13/256,472

(22) PCT Filed: Apr. 23, 2009

(86) PCT No.: PCT/JP2009/058097
§ 371 (c)(1),
(2), (4) Date: Sep. 14, 2011

(87) PCT Pub. No.: WO2010/122651
PCT Pub. Date: Oct. 28, 2010

(65) Prior Publication Data
US 2012/0001586 A1  Jan. 5, 2012

(51) Int. Cl.
*H02P 27/04* (2006.01)

(52) U.S. Cl.
USPC ........... 318/801; 318/800; 318/599; 318/811; 363/21.18; 363/40; 363/44

(58) Field of Classification Search
USPC ......... 318/599, 727, 799, 800, 801, 811, 430, 318/432, 437; 363/21.02, 21.1, 21.03, 363/21.18, 40, 44, 56.01, 55
See application file for complete search history.

(56) References Cited

U.S. PATENT DOCUMENTS

| | | |
|---|---|---|
| 5,155,671 A | 10/1992 | Inaba et al. |
| 5,742,493 A | 4/1998 | Ito et al. |
| 6,118,678 A | 9/2000 | Limpaecher et al. |
| 6,204,627 B1 | 3/2001 | Watanabe et al. |
| 6,307,759 B1 | 10/2001 | Inarida et al. |
| 6,437,997 B1 | 8/2002 | Inarida et al. |

(Continued)

FOREIGN PATENT DOCUMENTS

| | | |
|---|---|---|
| EA | 008239 B1 | 4/2007 |
| EP | 1404015 A2 | 3/2004 |

(Continued)

OTHER PUBLICATIONS

Office Action (Korean Decision of a Patent Grant) dated Oct. 30, 2012, issued in corresponding Korean Patent Application No. 10-2011-7024086. (2 pages).

(Continued)

*Primary Examiner* — Antony M Paul
(74) *Attorney, Agent, or Firm* — Buchanan Ingersoll & Rooney

(57) ABSTRACT

A power conversion device includes a converter-inverter controller for controlling a converter and an inverter. The power conversion device further includes a DC capacitor connected between the converter and the inverter and a DC capacitor voltage detector for detecting a DC capacitor voltage Efc between the connection ends of the DC capacitor. The converter-inverter controller provides variable control on the DC capacitor voltage Efc to the converter on the basis of the motor frequency of an AC motor, the DC capacitor voltage Efc, and a pulse mode. Within a predetermined range of motor frequencies, the converter-inverter controller fixes the PWM modulation factor of the inverter to a value m0 and provides operation control to the inverter, where the value m0 being to reduce a harmonic of a predetermined order included in the output voltage from the inverter.

7 Claims, 3 Drawing Sheets

(56) References Cited

U.S. PATENT DOCUMENTS

| | | | |
|---|---|---|---|
| 7,626,836 B2 * | 12/2009 | Leggate et al. | 363/41 |
| 7,978,483 B2 * | 7/2011 | Mazzola et al. | 363/17 |
| 7,990,097 B2 * | 8/2011 | Cheng et al. | 318/800 |
| 8,044,631 B2 * | 10/2011 | Dai et al. | 318/800 |
| 2006/0097689 A1 | 5/2006 | Kuroiwa et al. | |
| 2010/0277871 A1 | 11/2010 | Kitanaka et al. | |

FOREIGN PATENT DOCUMENTS

| | | |
|---|---|---|
| JP | 2-241369 A | 9/1990 |
| JP | 07-255103 A | 10/1995 |
| JP | 10-028397 A | 1/1998 |
| JP | 2008-086082 A | 4/2008 |
| JP | 4243308 B2 | 3/2009 |
| RU | 2115218 C1 | 7/1998 |
| RU | 2209502 C2 | 7/2003 |

OTHER PUBLICATIONS

First Office Action issued on Aug. 29, 2013, by the Chinese Patent Office in corresponding Chinese Patent Application No. 200980158862.4, and an English Translation of the Office Action. (13 pages).

Office Action from Russian Patent Office dated Nov. 9, 2012, issued in corresponding Russian Patent Appln. No. 2011147384/07, with English translation thereof (12 pages).

International Search Report (PCT/ISA/210) issued on Jun. 23, 2009, by Japanese Patent Office as the International Searching Authority for International Application No. PCT/JP2009/058097.

Written Opinion (PCT/ISA/237) issued on Jun. 23, 2009, by Japanese Patent Office as the International Searching Authority for International Application No. PCT/JP2009/058097.

* cited by examiner

POWER CONVERSION DEVICE

FIELD

The present invention relates to an electric-vehicle power conversion device for driving an AC motor using a converter for converting AC power to DC power and an inverter for converting the DC power to AC power. In particular, the invention relates to a power conversion device for reducing a harmonic component of a predetermined order included in an inverter output voltage.

BACKGROUND

In general, power conversion devices are known to control an induction motor so as to provide a constant ratio V/F of the AC output voltage to the AC output frequency from a transistor module in order to efficiently drive the motor at a variable frequency and at a variable voltage. To realize this constant V/F control, the PWM modulation factor needs to be varied in proportion to the output frequency of the transistor module. However, a typical PWM control scheme inverter is known to have a greater ratio of the carrier frequency voltage component to the fundamental wavelength voltage component at higher DC voltages and lower modulation factors, causing higher distortion. In lower frequency regions, this resulted in a large harmonic current to flow through the induction motor causing problems such as higher vibrations.

As means for solving such a problem, the conventional technique disclosed in Patent Literature 1 below is configured such that the DC voltage is fixed and the modulation factor of an inverter is varied in lower inverter output frequency regions to control the inverter output voltage. On the other hand, in higher inverter output frequency regions, the modulation factor is fixed and the DC voltage is varied, thereby controlling the inverter output voltage.

CITATION LIST

Patent Literature

Patent Literature 1: Japanese Patent Application Laid-open No. H10-028397

SUMMARY

Technical Problem

As described above, according to the conventional technique disclosed in Patent Literature 1 above, the modulation factor of the inverter is fixed and the DC voltage is varied to thereby control the inverter output voltage in higher inverter output frequency regions. However, the modulation factor at this time is not set to a value for reducing a harmonic of a predetermined order included in the inverter output voltage. The frequency of torque of the AC motor caused by the aforementioned harmonic component of the predetermined order may coincide with the resonance frequency of an apparatus which incorporates the power conversion device. This could cause the apparatus to have higher vibrations and noises.

The present invention was developed in view of the aforementioned problems. It is therefore an object of the invention to provide a power conversion device which can reduce harmonics of predetermined orders included in the inverter output voltage.

Solution to Problem

In order to solve the aforementioned problems and attain the aforementioned object, the power conversion device is provided with: A power conversion device including a converter for converting AC power to DC power, an inverter for converting the DC power to AC power at a given frequency and at a given voltage for output to an AC motor, and a control unit for controlling the converter and the inverter, the power conversion device comprising: a capacitor connected between the converter and the inverter; and a voltage detector for detecting a capacitor voltage between connection ends of the capacitor, wherein the control unit provide's variable control on the capacitor voltage to the converter on the basis of a frequency of the AC motor, the capacitor voltage, and a pulse mode; and within a predetermined range of frequency of the AC motor, fixes a PWM modulation factor of the inverter to a value to provide operation control to the inverter, the value being to reduce a harmonic of a predetermined order included in an output voltage from the inverter.

Advantageous Effects of Invention

According to the present invention, during the synchronizing pulse mode PWM control of an inverter, variable control on the DC capacitor voltage is provided to the converter, while the modulation factor is fixed to a value for reducing a harmonic of a predetermined order included in the inverter output voltage to run the inverter at variable voltages and at variable frequencies. This provides an effect of being capable of reducing harmonics of predetermined orders included in the inverter output voltage.

DESCRIPTION OF EMBODIMENT

Now, an embodiment of a power conversion device according to the present invention will be described below in more detail with reference to the drawings. Note that the invention is not limited by this embodiment.

Embodiment

Figure 1:
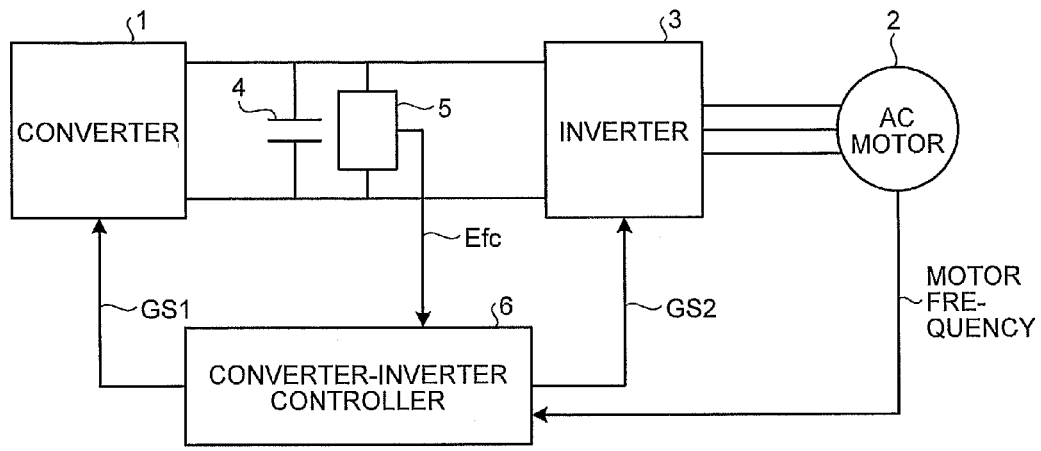
FIG. 1 FIG. 1 is a block diagram illustrating an example of the configuration of a power conversion device according to a first embodiment.

FIG. 1 is a block diagram illustrating an example of the configuration of a power conversion device according to a first embodiment. The power conversion device is configured to mainly include: a converter 1 for converting AC power to DC power; an inverter 3 for converting DC power to AC power to drive an AC motor 2 at a variable voltage and at a variable frequency; a DC capacitor 4 connected between the output of the converter 1 and the input of the inverter 3; a DC capacitor voltage detector (hereinafter simply referred to as the "voltage detector") 5 for detecting the voltage across the DC capacitor 4; and a converter-inverter controller (hereinafter simply referred to as the "control unit") 6 for controlling the converter 1 and the inverter 3.

The control unit 6 outputs a converter gate signal GS1 and an inverter gate signal GS2 on the basis of a DC capacitor voltage Efc and a motor frequency. The configuration and the operation of the control unit 6 will now be described in detail below.

Figure 2:
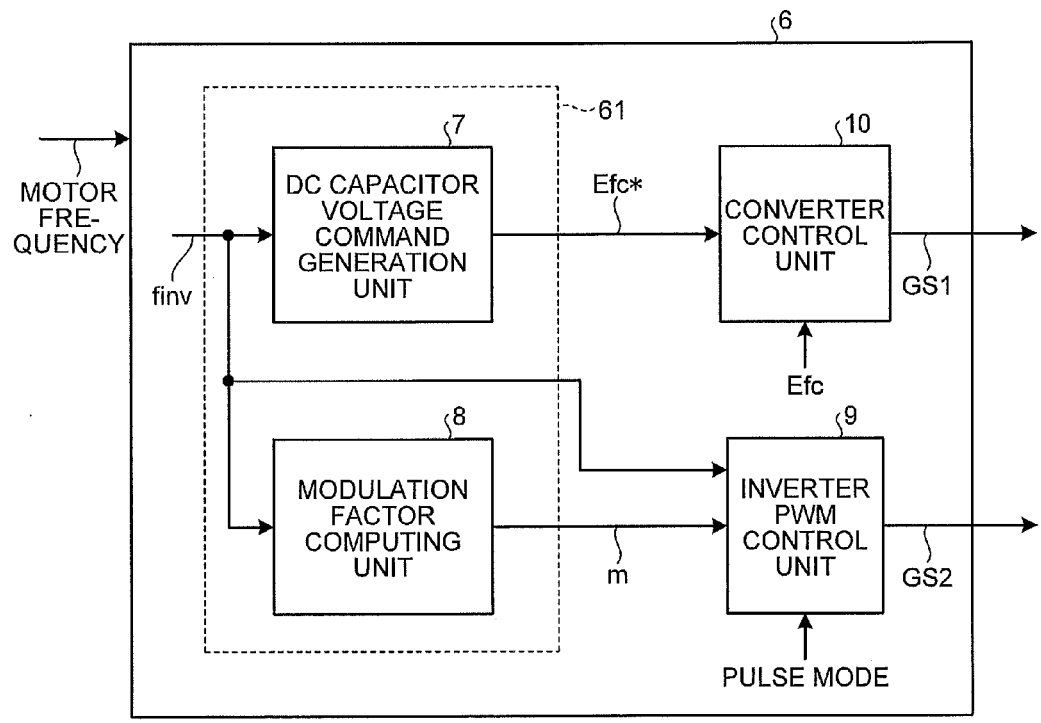
FIG. 2 is a block diagram illustrating the configuration of a control unit according to the first embodiment.

FIG. 2 is a block diagram illustrating the configuration of the control unit according to the first embodiment. The control unit 6 is configured to mainly include a computing unit 61, a converter control unit 10, and an inverter PWM control unit 9.

The computing unit 61 and the inverter PWM control unit 9 are supplied with an inverter frequency finv to control the AC motor 2 at a variable voltage and at a variable frequency. Note that the present embodiment allows for computing the inverter frequency finv from a motor frequency obtained by a velocity sensor (not shown) attached to the AC motor 2. However, in the absence of the velocity sensor, a velocity estimate value obtained by control with no velocity sensor may also be employed.

The computing unit 61 includes a DC capacitor voltage command generation unit 7 for computing a DC capacitor voltage command value Efc* as a function of the inverter frequency, and a modulation factor computing unit 8 for computing a modulation factor m for the inverter 3.

The converter control unit 10 receives the DC capacitor voltage command value Efc* and provides feedback control on the DC capacitor voltage Efc detected by the voltage detector 5 to output the converter gate signal GS1 which causes the DC capacitor voltage Efc to follow the DC capacitor voltage command value Efc*. In this way, the converter control unit 10 controls the converter 1.

The inverter PWM control unit 9 outputs the inverter gate signal GS2 on the basis of the inverter frequency finv, the modulation factor m, and a PWM pulse mode setting, thereby controlling the inverter 3.

A description will now be made to the operation of the control unit 6. The output voltage Vinv of the inverter 3 is related to the DC capacitor voltage Efc and the modulation factor m as expressed by Equation (1) below where K is a constant.

$$Vinv = K \cdot m \cdot Efc \quad (1)$$

Typically, the AC motor 2 is controlled at a variable voltage and at a variable frequency by the modulation factor computing unit 8 controlling the modulation factor m so as to hold the relationship expressed by Equation (1) with the DC capacitor voltage command value Efc* being a constant value as seen in the relationship between the inverter frequency finv and the DC capacitor voltage command value Efc* shown in relation to the DC capacitor voltage command generation unit 7.

The apparatus in which the power conversion device of the present invention is incorporated may have a resonance characteristic and the torque generated by the AC motor 2 may contain the aforementioned resonance frequency component. This would cause the aforementioned apparatus to vibrate and produce noises. In such a case, at around the inverter frequency finv0 which causes the resonance frequency to occur, the computing unit 61 adjusts the modulation factor m to a value (a modulation factor m0) that can reduce the resonance frequency.

Figure 3:
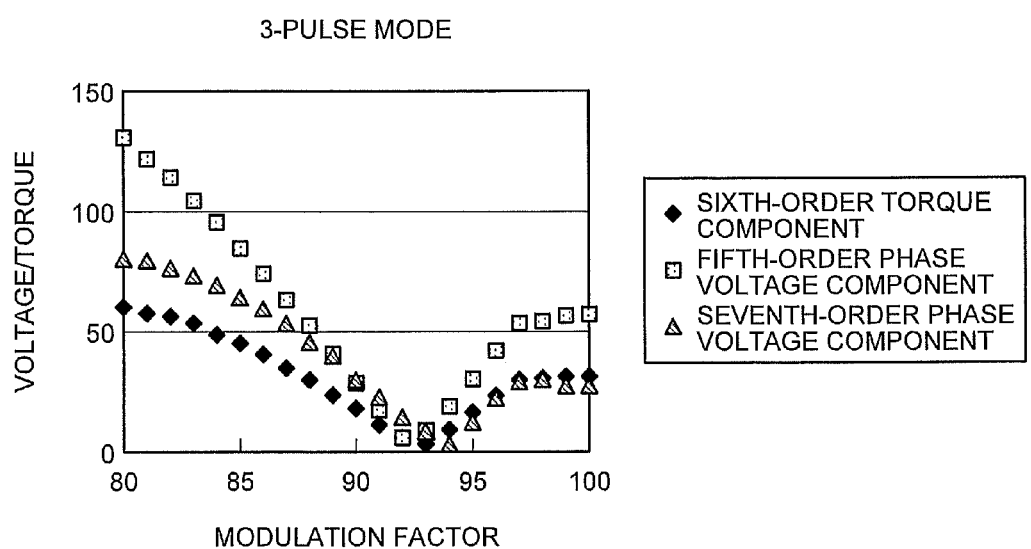
FIG. 3 is a view illustrating the relationship between fifth-order & seventh-order components of an inverter output voltage and a sixth-order component of torque, and the modulation factor computed in the control unit.
Figure 4:
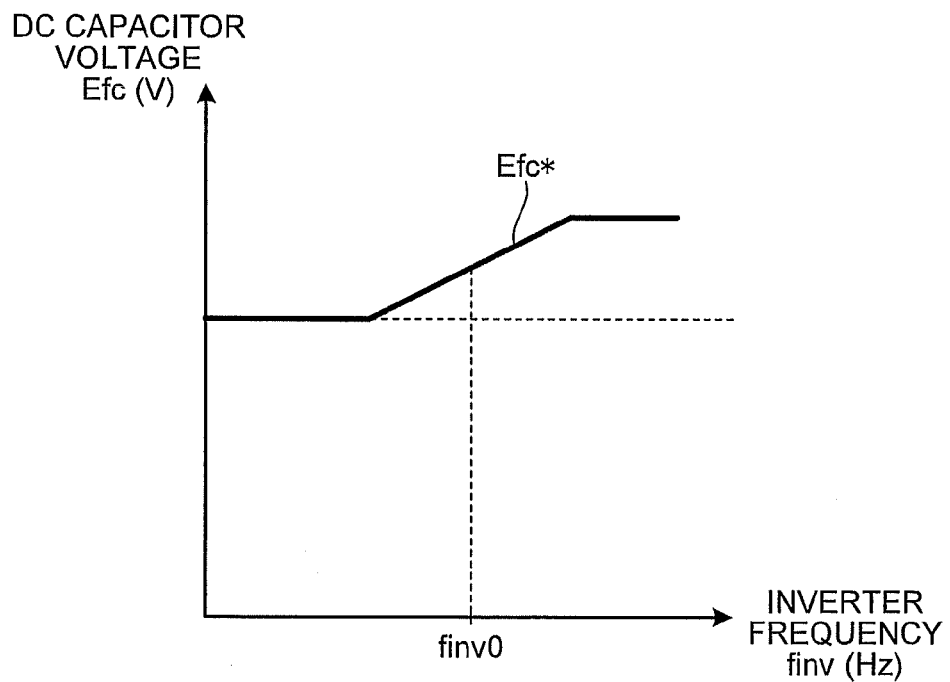
FIG. 4 is an explanatory view illustrating the operation of a DC capacitor voltage command generation unit.
Figure 5:
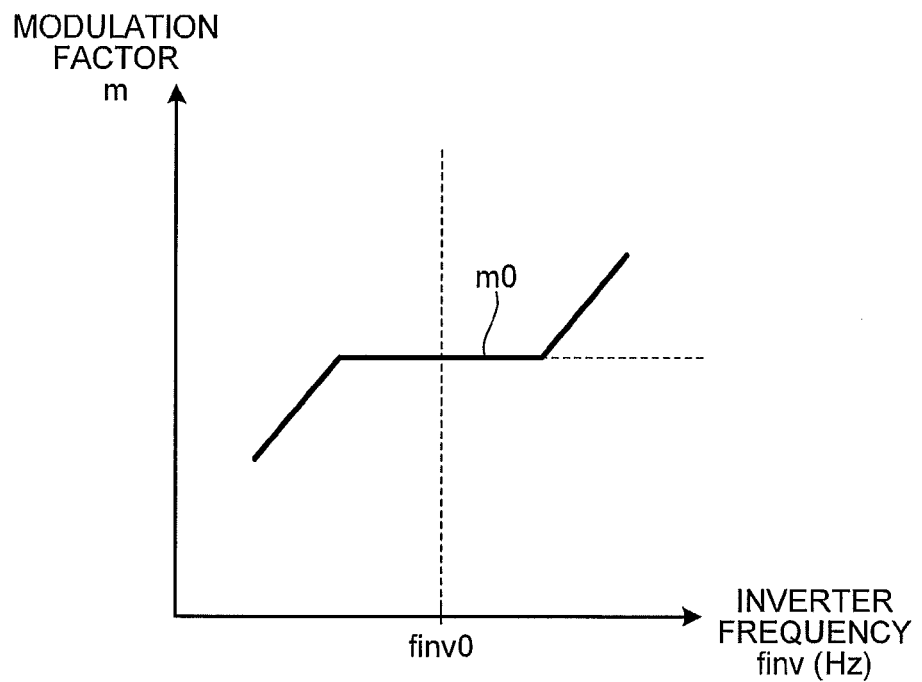
FIG. 5 is an explanatory view illustrating the operation of a modulation factor computing unit.

A specific example will be shown below. FIG. 3 is a view showing the relationship between the fifth-order & seventh-order components of the inverter output voltage and the sixth-order torque component, and the modulation factor computed in the control unit. FIG. 4 is an explanatory view illustrating the operation of the DC capacitor voltage command generation unit. FIG. 5 is an explanatory view illustrating the operation of the modulation factor computing unit.

FIG. 3 shows the relationship among the modulation factor with the inverter 3 being a 3-level inverter and the pulse mode being a synchronous 3-pulse mode; the fifth-order and seventh-order frequency components included in the inverter output voltage (phase voltage); and the sixth-order frequency component of the torque generated by the AC motor 2 at voltages of these frequency components.

If the apparatus that incorporates the power conversion device according to the present embodiment has a resonance frequency of, for example, 480 Hz, the inverter frequency at which the sixth-order torque frequency component is 480 Hz is 480/6=80 Hz. That is, in FIGS. 4 and 5, the inverter frequency finv0 at which the resonance frequency component appears is at around 80 Hz. Thus, the modulation factor m0 at which the resonance frequency (around 80 Hz) can be reduced falls, for example, in the range of 0.92 to 0.94 from the relationship given in FIG. 3. It is therefore possible to reduce the sixth-order torque component by setting the modulation factor m0 at around the inverter frequency finv0 (around 80 Hz) to the aforementioned value.

As described above, the power conversion device according to the present embodiment causes the DC capacitor voltage command generation unit 7 to provide variable control on the DC capacitor voltage Efc to the converter 1 during the synchronizing pulse mode PWM control of the inverter. Additionally, the power conversion device causes the modulation factor computing unit 8 to set the modulation factor m to a value at which a frequency component of a predetermined order included in the phase voltage can be reduced, thereby running the inverter 3 at a variable voltage and at a variable frequency. Accordingly, the power conversion device according to the present embodiment can reduce the vibration and the noise of an apparatus that incorporates the power conversion device even when the frequency of the torque of the AC motor 2 caused by a harmonic component of a predetermined order coincides with the resonance frequency of the apparatus.

Furthermore, the harmonic component of the torque generated by the AC motor 2 is the same as the harmonic component of a DC current flowing through the DC circuit between the converter 1 and the inverter 3. Thus, the power conversion device according to the present embodiment can also reduce the DC current component of a predetermined order included in the DC current flowing through the DC circuit between the converter 1 and the inverter 3.

Note that the converter 1 according to the present embodiment may be a single-phase converter or a three-phase converter, each being a 2-level converter or a 3-level converter. On the other hand, the inverter 3 to be combined with each converter 1 may also be either a three-phase 2-level inverter or a three-phase 3-level inverter.

Furthermore, the AC motor 2 may be either a three-phase induction motor or a three-phase synchronous motor.

As described above, the power conversion device according to the present embodiment is configured to include the control unit 6. During the synchronizing pulse mode PWM control of the inverter, the control unit 6 provides variable control on the DC capacitor voltage Efc to the converter 1 and sets the modulation factor m to a value at which the frequency component of a predetermined order included in the phase voltage can be reduced, thereby running the inverter 3 at a variable voltage and at a variable frequency. It is thus possible to reduce the vibration and noise of an apparatus that incorporates the power conversion device even when the frequency of the torque of the AC motor 2 caused by the harmonic component of a predetermined order coincides with the resonance frequency of the apparatus. It is also possible to reduce the DC current component of a predetermined order by setting a modulation factor which allows for reducing the DC current component of a predetermined order included in the DC current flowing through the DC circuit between the converter 1 and the inverter 3.

Industrial Applicability

As described above, the power conversion device according to the present invention is applicable to an AC electric vehicle, and particularly useful as an invention for causing a single-phase converter to convert single-phase AC power to DC power and causing a three-phase inverter to convert the DC power to AC power in order to control a three-phase induction motor or a three-phase synchronous motor, thereby reducing the vibration and the noise of an apparatus which is incorporated in the electric vehicle.

Reference Signs List

1 CONVERTER
2 AC MOTOR
3 INVERTER
4 DC CAPACITOR
5 DC CAPACITOR VOLTAGE DETECTOR (VOLTAGE DETECTOR)
6 CONVERTER-INVERTER CONTROLLER (CONTROLLING UNIT)
7 DC CAPACITOR VOLTAGE COMMAND GENERATION UNIT
8 MODULATION FACTOR COMPUTING UNIT
9 INVERTER PWM CONTROL UNIT
10 CONVERTER CONTROL UNIT
61 COMPUTING UNIT
Efc DC CAPACITOR VOLTAGE (CAPACITOR VOLTAGE)
Efc* DC CAPACITOR VOLTAGE COMMAND VALUE (CAPACITOR VOLTAGE COMMAND VALUE)
finv INVERTER FREQUENCY
finv0 INVERTER FREQUENCY WHICH CAUSES THE RESONANCE FREQUENCY COMPONENT TO OCCUR
GS1 CONVERTER GATE SIGNAL
GS2 INVERTER GATE SIGNAL
m, m0 MODULATION FACTOR

The invention claimed is:

1. A power conversion device including a converter for converting AC power to DC power, an inverter for converting the DC power to AC power at a given frequency and at a given voltage for output to an AC motor, and a control unit for controlling the converter and the inverter, the power conversion device comprising:
a capacitor connected between the converter and the inverter; and
a voltage detector for detecting a capacitor voltage between connection ends of the capacitor, wherein
the control unit provides variable control on the capacitor voltage to the converter on the basis of a frequency of the AC motor, the capacitor voltage, and a pulse mode, and fixes a PWM modulation factor to a predetermined value within a range of 0.92 to 0.94 in order to provide operation control to the inverter, the PWM modulation factor being provided at around an inverter frequency which is $\frac{1}{6}$ a resonance frequency of an apparatus which incorporates the power conversion device.

2. The power conversion device according to claim 1, wherein at around the inverter frequency which is $\frac{1}{6}$ the resonance frequency, the control unit fixes the PWM modulation factor to a value in order to provide operation control to the inverter, the value being to reduce a fifth-order or seventh-order harmonic included in an output voltage of the inverter.

3. The power conversion device according to claim 1, wherein the control unit comprises a computing unit for computing a voltage command value for the capacitor voltage and the PWM modulation factor on the basis of the frequency of the AC motor.

4. The power conversion device according to claim 1, wherein for a 3-pulse mode the PWM modulation factor falls in a range of 0.92 to 0.94.

5. The power conversion device according to claim 1, wherein
the converter is any one of a single-phase 2-level converter, a three-phase 2-level converter, a single-phase 3-level converter, and a three-phase 3-level converter, and
the inverter is a three-phase 2-level inverter.

6. The power conversion device according to claim 1, wherein
the converter is any one of a single-phase 3-level converter and a three-phase 3-level converter, and
the inverter is a three-phase 3-level inverter.

7. The power conversion device according to claim 1, wherein the AC motor is either a three-phase induction motor or a three-phase synchronous motor.

* * * * *